United States Patent

Galloway et al.

[15] 3,676,547
[45] July 11, 1972

[54] ASCARIS SUUM VACCINE

[72] Inventors: Reginald B. Galloway, Indianapolis; Raymond F. Shumard, Greenfield, both of Ind.

[73] Assignee: Eli Lilly and Company, Indianapolis, Ind.

[22] Filed: Sept. 18, 1970

[21] Appl. No.: 73,620

[52] U.S. Cl. .................................................. 424/88
[51] Int. Cl. ........................................... A61k 23/00
[58] Field of Search ...................................... 424/88

[56] References Cited

UNITED STATES PATENTS

| | | | |
|---|---|---|---|
| 3,395,218 | 7/1968 | Silverman | 424/88 |
| 3,429,966 | 2/1969 | Gall | 424/88 X |

FOREIGN PATENTS OR APPLICATIONS

| | | |
|---|---|---|
| 902,760 | 8/1962 | Great Britain |
| 602,465 | 7/1960 | Canada |

OTHER PUBLICATIONS

Campbell W. C. et al., J. Parasitol 51:712– 716 (1965) " Immunization of Rats Against Ascaris Suum by Means of Non–pulmonary Larval Infections"

Crandall G. A. et al., Am. J. Trop. Med. Hyg 14:765– 769 (1965) " The Protective Effect of Viable and Non–viable Ascaris Suum Larvae and Egg Preparations in Mice"

Taffs, L. F. J. Helminth 38:129– 170 (1964) " Immunological Studies on Experimental Infection of Pigs with Ascaris Suum, Goeze, 1782"

Kelley G. W. et al. J. Parasitol 49(5) pt. 2 p. 33 (1964) " Passive Immunity in Pigs to Migrating Larvae of Ascaris Suum"

Kelley G. W. et al. J. Parasitol 50:499– 503 (1964) " Acquired Immunity to Migrating Larvae of Ascaris Suum Induced in Pigs by Repeated Oral Inoculations of Infected Eggs"

Kelley G. W. et al. Am. J. Vet. Res. 26:948– 950 (1965) " Passive Immunity to Ascaris Suum Transferred in Colostrum from Sows to Their Offspring"

Kelley G. W. et al. Cornell Vet. 55:607– 612 (1965) " Passive Immunity to Migrating Ascaris Suum Transmitted by Parenterally Administered Immune Serum or Immune Globulins"

*Primary Examiner*—Shep K. Rose
*Attorney*—Everet F. Smith and James L. Rowe

[57] ABSTRACT

Ascaris suum vaccine containing antigen(s) obtained from second and third stage larvae and method of cultivation of such larvae.

3 Claims, No Drawings

ASCARIS SUUM VACCINE

BACKGROUND OF THE INVENTION

There have been many attempts to prepare highly antigenic vaccines from helminths such as *Ascaris lumbricoides* var. suum (to be referred to hereinafter as *Ascaris suum*). Sprent and Chen, *J. of Infect. Dis.* 84, 111 (1949) attempted to locate antigens in *Ascaris* which were effective in aiding the host to resist infection as by preventing larval migration from intestine to lungs. They prepared Ascaris vaccines from cuticle, body fluid, intestine, ovary, and whole adult worm without a consistent immune reaction being produced. Other vaccines made from metabolic products and egg extracts also did not induce a consistent degree of resistance in mice. Soulsby, *Nature* 179, 784 (1957) found that subcutaneous injection of embryonated and infective ova, which produced a depot of viable eggs, gave some protective immunity. He also found that extracts of infective ova and preparation of larval excretions and secretions gave a small degree of reduction of migration and growth of larvae from a challenge infection. A later review of continuing experiments by Soulsby, *Ann. New York Acad. Sci.* 113, 492 (1963), indicated that antigens prepared by in vitro cultivation of third stage larvae harvested from rabbit lungs seven days after infection could be used as a vaccine to protect guinea pigs from massive challenge doses of Ascaris ova. Soulsby concluded that "[t]here are protective antigens situated inside the body of the helminth and not all functional antigens are of excretory or secretory origin." Another worker in the field, Oliver-Gonzalez, *Am. Soc. of Tropical Med. and Hyg.* 5, 381 (1956) immunized guinea pigs with the following *Ascaris suum* materials: whole adult worms, eggs disected from uteri, and embryonated eggs. Only the lungs from animals immunized with the latter material showed marked evidence of protection. Taffs, *J. Helminth.* 34, 347 (1960) attempted to immunize guinea pigs with third stage larvae obtained from the lungs of other guinea pigs on the sixth day of infection. Some degree of protection was found although the method of immunization was no better than oral dosage with Ascaris ova.

In related work, British patent 894,603 (April 26, 1962) describes a method of producing helminth antigens from Nippostrongylus, Haemonchus, and Trichinella sp. wherein third stage infective nematode larvae are developed into histotrophic stages by incubation in a sterile aqueous culture medium. The larvae-containing medium is used as a vaccine. Following this lead, Silverman and co-workers, in a paper appearing in the *J. Parasit.* 48, 562 (1962), prepared antigens from axenic helminth cultures. Histotrophic antigens ($L_4$ antigens) were obtained from cultures of *Dictyocaulus viviparus*, *Trichostrongylus colubriformis*, *Strongyloides papillosus*, and *Haemonchus contortus* by the procedure set forth in the aforementioned British patent. Significant immunization was obtained. The preparations were not, however, entirely satisfactory for field use with sheep. An excellent review by Silverman, Alger and Hansen, *Annals N.Y. Acad. of Sci.* 139, 124 (1966) compares the antigens produced by axenic cultures of various helminths with the antigens obtained from various larval stages of helminths from sheep lungs and the like.

It is an objective of this invention to prepare an *Ascaris suum* vaccine from *Ascaris suum* larval stages produced by the axenic cultivation of *Ascaris suum*.

SUMMARY

In fulfillment of the above and other objects, this invention provides an *Ascaris suum* larval vaccine effective in pigs against migrating ascarid larvae. The vaccine is prepared as follows:

The distal 1 –1-½ inches of the uteri adult female *Ascaris suum* worms are excised and collected in a small amount of water. An equal volume of 1N aqueous sodium hydroxide is added and, with occasional stirring, this mixture is held at room temperature for about 4 hours after which time much of the uterine tissue has been broken down. The suspension is then ground in a tissue grinder and the eggs are washed with water until the supernate is clear. The washed eggs are suspended in an 0.5 percent formalin solution and placed in a Salvarsen tube. Filtered air is bubbled slowly into the bottom of the tube while the suspension is held at about 28° C. After 30 days under these conditions, the fertilized ova are embryonated and are at the infective stage. The embryonated ova are washed several times, resuspended in fresh 0.5 percent formalin solution and held in the refrigerator until used.

When it is desired to prepare a vaccine, the embryonated eggs are then centrifuged and resuspended in five percent sodium hypochlorite. This suspension is shaken gently at 37° C. for about 2 and ½ hours after which time most of the cortex has been eroded away and blebs have begun to form on the intermembranes. The larvae become quite active inside the egg at this time, pushing against the vitelline membrane.

The de-shelled eggs are washed several times with sterile water to remove all residual sodium hypochlorite, and are then resuspended in Earle's Balanced Salt Solution (or any suitable balanced salt solution). Earle's Balanced Salt Solution contains the following ingredients per liter: 0.8 g. sodium chloride, 0.4 g. potassium chloride, 0.125 g. sodium dihydrogen-phosphate dihydrate, 0.2 g. magnesium sulfate heptahydrate, 1.0 g. glucose, 0.2 g. calcium chloride, 0.01 g. phenol red and 2.2 sodium bicarbonate. (Aseptic techniques are used from the sodium hypochlorite treatment stage on, if the larvae are to be used in culturing.) Carbon dioxide gas is bubbled through the egg suspension while shaking gently at 37° C. to cause the eggs to hatch. In ½ to 1-½ hours, 80 to 100 percent of the eggs hatch, if the sodium hypochlorite treatment has been sufficient. The hatched larvae are then washed with water several times by gentle centrifugation. The second stage ($L_2$) ensheathed larvae thus produced are next treated with a sterile solution of 2 percent trypsin, optionally in buffered saline at pH = 8.0, for 1 to 2 hours while shaking at 37° C. This treatment causes most of the larvae to lose their sheaths.

The exsheathed larvae so prepared are again washed several times in Eagle's Minimum Essential Medium (MEM) plus the following antibiotics at the indicated level per ml. of final concentration: 100 mcg. penicillin V., potassium salt; 100 mcg. streptomycin sulfate; and 5 mcg. fungizone.

Eagle's Minimum Essential Medium contains the following ingredients added to the above-described Earle's Balanced Salt Solution:

| Component | Gms/L |
| --- | --- |
| L-arginine Hydrochloride | .126 |
| L-cystine | .024 |
| L-tyrosine | .036 |
| L-histidine Hydrochloride Hydrate | .042 |
| L-glutamine | .292 |
| L-isoleucine | .0525 |
| L-leucine | .0524 |
| L-lysine Hydrochloride | .073 |
| L-methionine | .015 |
| L-phenylalanine | .033 |
| L-threonine | .048 |
| L-tryptophan | .010 |
| L-valine | .047 |
| Choline Chloride | .001 |
| Folic Acid | .001 |
| i-inositol | .002 |
| Nicotinamide | .001 |
| Ca-D-Pantothenate | .001 |
| Pyridoxal Hydrochloride | .001 |
| Riboflavin | .0001 |
| Thiamine Hydrochloride | .001 |

The larvae are then cultured in Eagle's MEM containing 10 percent serum, or in other suitable media, an instance being NCTC 125 medium plus serum, in a round bottle with a liquid to gas phase of about 1:10, while being slowly rotated (10 – 40 RPM) at 37°–38° C. for about 6 days. The gas phase is 5 percent carbon dioxide and 95 percent air. The final larval concentration is 10,000 to 30,000 larvae per ml. of medium.

Equal numbers of newly hatched ($L_2$) and cultured larvae ($L_3$) from the above procedure are prepared for use in a vaccine by sonicating them in an ice bath until well disintegrated.

A sonicate prepared as above combined with equal larval equivalents of hatching fluid (HF) and the 6-day larval culture ($L_3F$) medium. This combined vaccine was injected into the axillary region of four weanling pigs 7 weeks old at the rate of 25,000 larval equivalents per week for 3 weeks. Another group of four pigs received a vaccine containing only the medium the larvae had been cultured in ($L_3F$) at the rate of 50,000 larval equivalents per week for 3 weeks. A third group of four pigs were similarly injected with sham doses of Eagle's Minimum Essential Medium (fresh medium) and served as controls. All preparations contained 10 percent of a 2 percent aluminum oxide aqueous gel. Eight days after the last immunizing dose all pigs were challenged orally with 10,000 infective Ascaris suum ova for 3 days. Eleven days after the last challenge dose, all the pigs were sacrificed and the small intestine, liver and lungs removed for scoring on a 0 – 4 scale for gross pathology due to ascarids or, in the case of the small intestine, these were washed with a little water and screened and the larvae counted.

The following table gives the results of the above vaccination experiment. In the table, column 1 gives the treatment used, columns 2 and 3 the mean weights of the pigs at the start and end of the trial, respectively, column 4 the gross pathology score for liver and lungs, column 5 the number of larvae found in the small intestine and column 6 the average number of adult worms in four pigs.

TABLE I

| Treatment Used | Mean Weight of Pigs at Start | Mean Weight of Pigs at End | Average Gross Pathology Score liver | lungs | Number of Larvae Small Intestine | Average Number of Adult Worms |
|---|---|---|---|---|---|---|
| "Complete" Vaccine | 27.5 | 60.0 | 3.5 | 1.2 | 525 | 0.3 |
| $L_3F$ Vaccine | 29.8 | 57.5 | 2.0 | 0.75 | 465 | 0.5 |
| Control | 25.3 | 53.5 | 3.75 | 1.25 | 1,200 | 0.5 |

In a second trial using newly hatched larvae ($L_2$) and early $L_3$ larvae from Ascaris suum larval cultures as outlined above, a vaccine was prepared by sonicating the larvae and combining these with both the hatching fluid (HF) and the collected culture medium ($L_3F$) (thus making a complete vaccine). Two percent aluminum hydroxide gel was added to the preparation as before. Groups of weanling pigs (about 8 weeks old) were given about 25,000 larval equivalents of the above complete vaccine in the axillary region once a week for 3 consecutive weeks. Fourteen days after the last vaccination, all animals (controls and vaccinates) were challenged with 10,000 Ascaris suum larvae per day for 3 consecutive days. Pigs were sacrificed on the seventh, eleventh, or fourteenth day after the last challenge dose and larval counts were performed on the lung and small intestine. The whole small intestine was washed, the contents screened and aliquots counted. Fifteen grams of lung tissue were removed from each pig, digested and larval counts made.

In Table II which follows the results of this trial are set forth.

In the table, column 1 gives the sacrifice day, column 2 the number of pigs, columns 3 and 4 the larval counts for the vaccinated pigs, and columns 5, 6, and 7 similar information for the pigs in the control groups.

TABLE II

| Vaccinated Sacrifice Day | No. of Pigs | No. of Lung Larvae | No. of intestinal Larvae | Control No. of Pigs | No. of Lung Larvae | No. of intestinal Larvae |
|---|---|---|---|---|---|---|
| 7 | 3 | 24.5 | 43.3 | 3 | 293 | 192.6 |
| 11 | 3 | 4.6 | 747 | 3 | 17.6 | 4170 |
| 14 | 3 | 0 | 1170 | 3 | 0 | 3325 |

In addition, other studies have shown that it is possible to reinforce the immunity of the suckling pig by immunizing the parent gilt or sow with complete vaccine containing larval culture fluid ($L_3F$) produced as indicated above, such reinforced immunity of the suckling pig being manifested by increased weight gain performance as compared to offspring of non-vaccinated gilts or sows.

Vaccines produced in accordance with this invention can act at two different sites to prevent or curtail the migration of Ascaris suum larvae. These two sites are in the liver and small intestine for second stage larvae and in the small intestine after larval migration has been completed. It is believed that our Ascaris suum cultured larval vaccine acts both in the small intestine and in the liver. The vaccines thus produced can be administered either parenterally, as illustrated above, or orally.

We claim:

1. The process of preparing an Ascaris suum vaccine useful in immunizing pigs which comprises treating embryonated Ascaris suum ova with sodium hypochlorite until the cortex has been substantially eroded, resuspending the thus de-shelled ova in a balanced salt solution with carbon dioxide until the ova hatch, exsheathing the hatched larvae with trypsin and then axenically culturing said second stage exsheathed larvae in a suitable axenic culture medium containing essential amino acids and growth factors for said larvae until the majority of said larvae have grown to the third stage, sonicating said cultured larvae until well disintegrated, and then combining equal numbers of (1) and (2); (1) said sonicated larvae with (2) sonicated and thereby well-disintegrated freshly hatched second stage larvae; and combining (1) and (2) with equal larval equivalents of (3) and (4); (3) larval hatching fluid and (4) second stage larval culture fluid from said second stage larval culture; to form an Ascaris suum complete 4-component vaccine.

2. A complete 4-component Ascaris suum vaccine containing effective immunizing dose amounts of vaccine useful in immunizing pigs when administered at the rate of 25,000 larval equivalents per week for 3 weeks, prepared in accordance with the procedure of claim 1.

3. An incomplete Ascaris suum vaccine containing effective immunizing dose amounts of vaccine useful in immunizing pigs when administered at the rate of 50,000 larval equivalents per week for 3 weeks consisting essentially of, as the major component, a second stage larval culture fluid prepared as the component (4) of the complete vaccine in accordance with the complete 4-component Ascaris suum vaccine forming procedure of claim 1.

* * * * *